Aug. 4, 1970  H. O. HOLLOWAY ET AL  3,522,872
TRAY UNLOADING MECHANISM AND CONVEYOR STOP
MEANS FOR DISHWASHING MACHINE
Filed Jan. 15, 1968  5 Sheets-Sheet 4

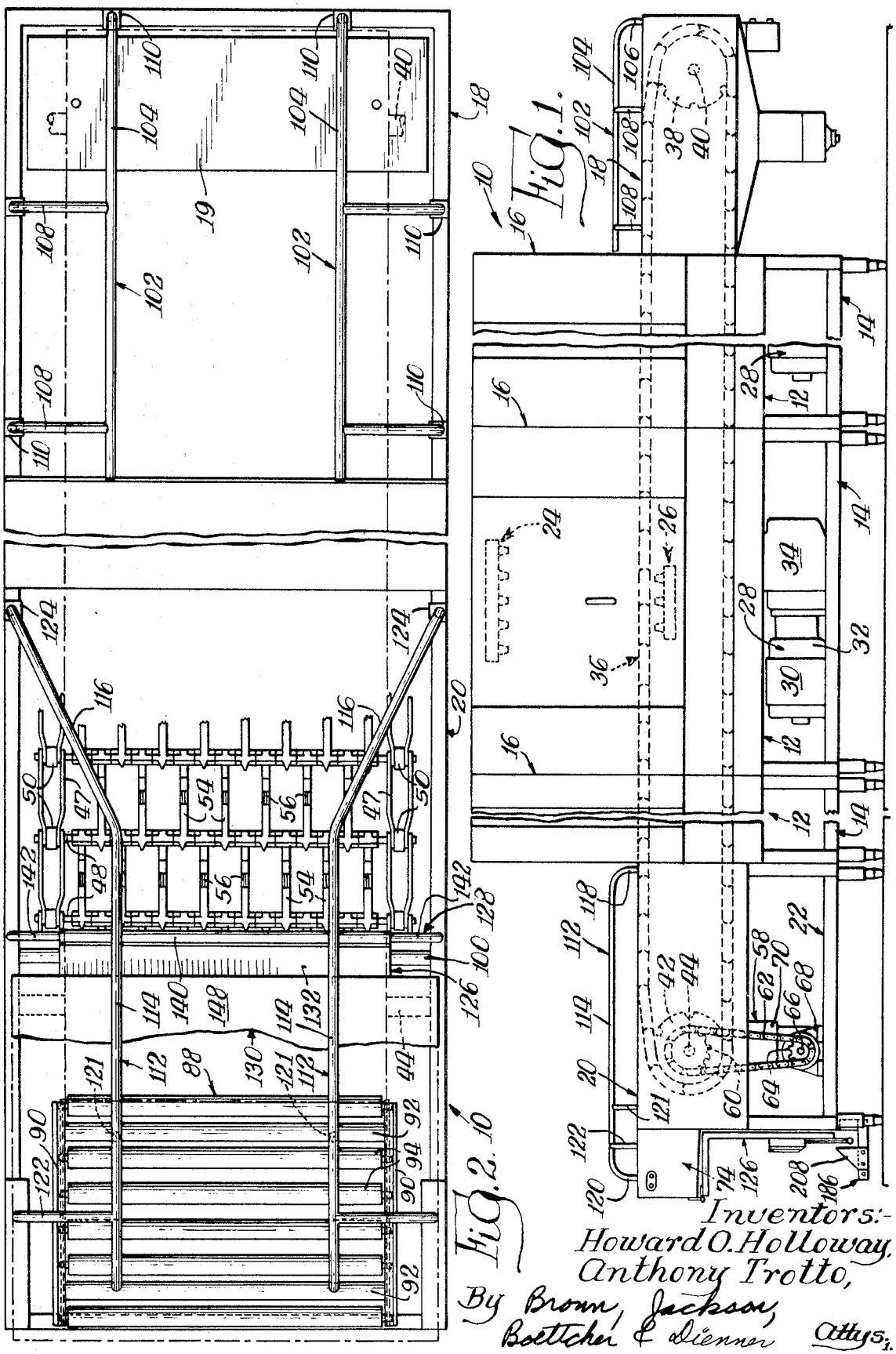

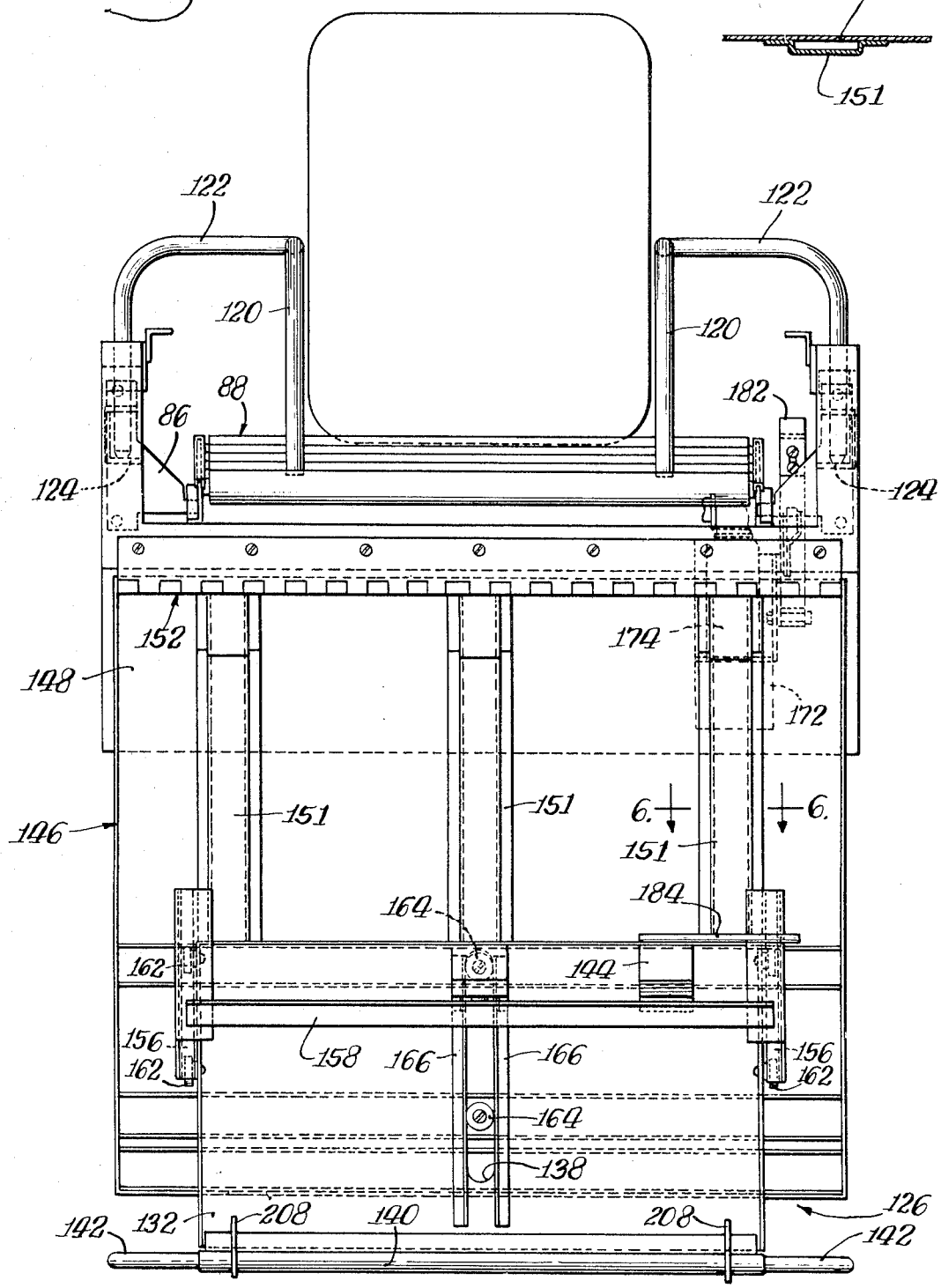

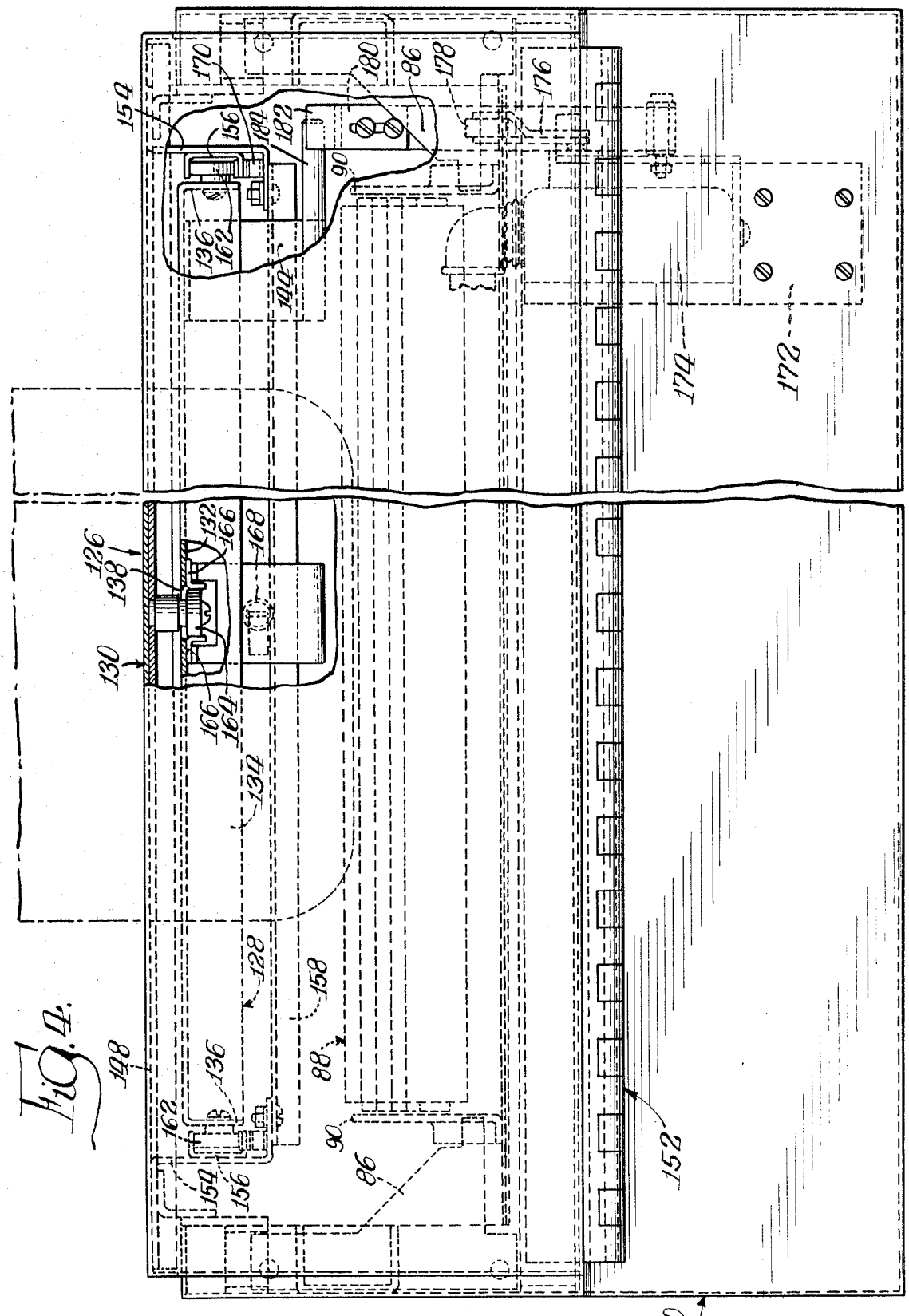

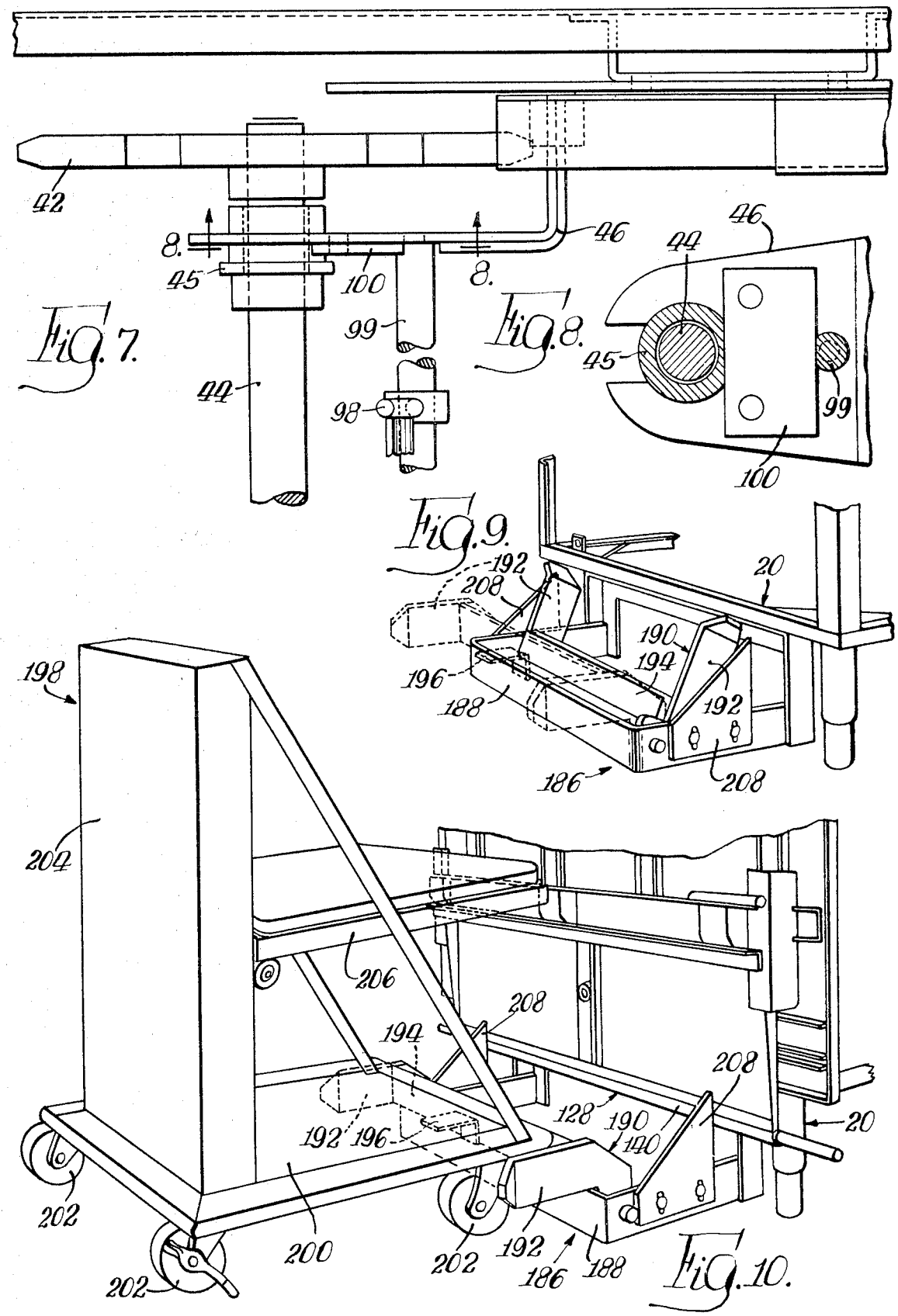

United States Patent Office 3,522,872
Patented Aug. 4, 1970

3,522,872
TRAY UNLOADING MECHANISM AND CONVEYOR STOP MEANS FOR DISHWASHING MACHINE
Howard O. Holloway, River Grove, and Anthony Trotto, Bellwood, Ill., assignors to G. S. Blakeslee & Co., Cicero, Ill., a corporation of Delaware
Filed Jan. 15, 1968, Ser. No. 697,926
Int. Cl. B65g 43/08, 47/22
U.S. Cl. 198—29         17 Claims

ABSTRACT OF THE DISCLOSURE

A roller conveyor assembly located at the unloading end of an endless conveyor of a dishwashing machine for receiving trays and the like discharged from the conveyor and directing the same outwardly of the machine, e.g., to a mobile tray cart, and guide means at the loading and unloading ends of the conveyor to align trays and the like moving through the machine. Also provided at the unloading end of the conveyor is conveyor stop means which may be positioned in operative position overlying the roller conveyor assembly for stopping the conveyor under selective conditions, and which may be pivoted away from the operative position to an inoperative position to expose the roller conveyor assembly for use.

BACKGROUND OF THE INVENTION

Field of the invention

The present invention pertains generally to commercial dishwashing machines of the flight conveyor type which are used extensively in restaurants, hospitals and like establishments, and more particularly to tray unloading mechanism and automatically or manually operable stop means for interrupting the drive means of the conveyor, for example, in emergency situations.

Description of the prior art

In a flight conveyor type dishwashing machine, dishes and other articles are inserted manually, at the loading end of the machine, between the bights or links of an endless conveyor, or are loaded into racks which are supported on the top surface of the conveyor. These articles are moved by the conveyor through the machine between various sets or pairs of upper and lower spray means so as to be subjected to washing and rinsing operations. At the unloading end of the machine, the articles are adapted to be removed manually from the conveyor. Occasionally, the operator at the unloading end of the machine fails to remove in good time finally washed and rinsed dishes or other articles. To prevent jamming of the conveyor and breakage of articles in these circumstances, various arrangements for automatically stopping the conveyor have heretofore been proposed.

Also, in a bight conveyor type dishwashing machine, trays, empty racks and the like are loaded into or onto one end of the conveyor and moved through the machine so as to be subjected to washing and rinsing operations. When a series of trays and the like are being washed, it is desirable that they be discharged from the conveyor and machine in an orderly fashion so as to eliminate individual manual removal. With the conveyor stop means of the aforesaid copending application, automatic discharge of trays and the like from the conveyor is impossible. And, in a dishwashing machine without conveyor stop means, automatic discharge of trays and the like is normally impractical because of the longitudinal misalignment of the trays either during placement into the conveyor or during movement through the machine. Accordingly, prior dishwashing machines have not been adapted for automatic tray unloading.

SUMMARY OF THE INVENTION

In accordance with the present invention, conveyor stop means is arranged to be disposed in an operative position at the unloading end of the conveyor, and is pivotally mounted to the machine so that it may be pivoted away from the operative position to an inoperative position permitting unrestricted discharge of trays, racks and the like from the unloading end of the conveyor. In addition, a roller conveyor assembly is mounted at the unloading end of the conveyor and is adapted to receive trays and the like discharged from the conveyor and to direct the same outwardly of the machine into self-levelling storage carts. In this connection, upwardly projecting stationary arm means is arranged to be engaged by trays carried edgewise in the conveyor for effecting tilting of the latter in a rearward direction as the trays are about to be discharged onto the roller conveyor assembly. And, guide means are provided at the loading and unloading ends of the conveyor for aligning trays and the like longitudinally of the conveyor as they move through the machine so that they may be directed outwardly of the machine in an orderly fashion for automatic stacking. Still further, a cart positioner assembly is mounted at the foot of the machine for locating a cart to receive trays discharged from the roller conveyor assembly.

In the preferred embodiment of the present invention, the roller conveyor assembly underlies the conveyor stop means when the latter is in operative position, and is fully exposed when the conveyor stop means is in inoperative position. Also, the guide means, which serve to align trays when the roller conveyor assembly is in use, are arranged to be removed from the machine to permit the conveyor stop means to be pivoted to its operative position when articles other than trays and the like are to be washed. Accordingly, the present invention contemplates the provision of tray unloading mechanism, tray aligning guide means, cart positioner means and conveyor stop means which are cooperatively arranged for compatible use in different modes of operation of the dishwashing machine. Other features and advantages of the present invention will become apparent from the following detailed description.

BRIEF DESCRIPTION OF THE DRAWINGS

FIG. 1 is a side elevational view, foreshortened in part, of a flight conveyor type of dishwashing machine in which the present invention is embodied and illustrates the conveyor stop means in inoperative position;

FIG. 2 is a plan view, on an enlarged scale and foreshortened in part, of the loading and unloading ends of the dishwashing machine of FIG. 1;

FIG. 3 is an end elevational view, on a further enlarged scale of the unloading end of the dishwashing machine of FIG. 1;

FIG. 4 is an end elevational view, on a still further enlarged scale and foreshortened in part, of the unloading end of the dishwashing machine of FIG. 1, illustrating the conveyor stop means in operative position;

FIG. 6 is a sectional view, taken substantially along the line 6—6 in FIG. 3, looking in the direction indicated by the arrows;

FIG. 7 is a fragmentary plan view of one end of the conveyor drive shaft and mounting means therefor;

FIG. 8 is a sectional view, taken substantially along the line 8—8 in FIG. 7, looking in the direction indicated by the arrows;

FIG. 9 is a perspective view of the car positioner assembly at the foot of the dishwashing machine; and FIG. 10 is a perspective view of the cart positioner assembly of FIG. 9, with a mobile tray cart located in a tray receiving position, and with the conveyor stop means retained in its inoperative position.

DESCRIPTION OF THE PREFERRED EMBODIMENT

Figure 5:
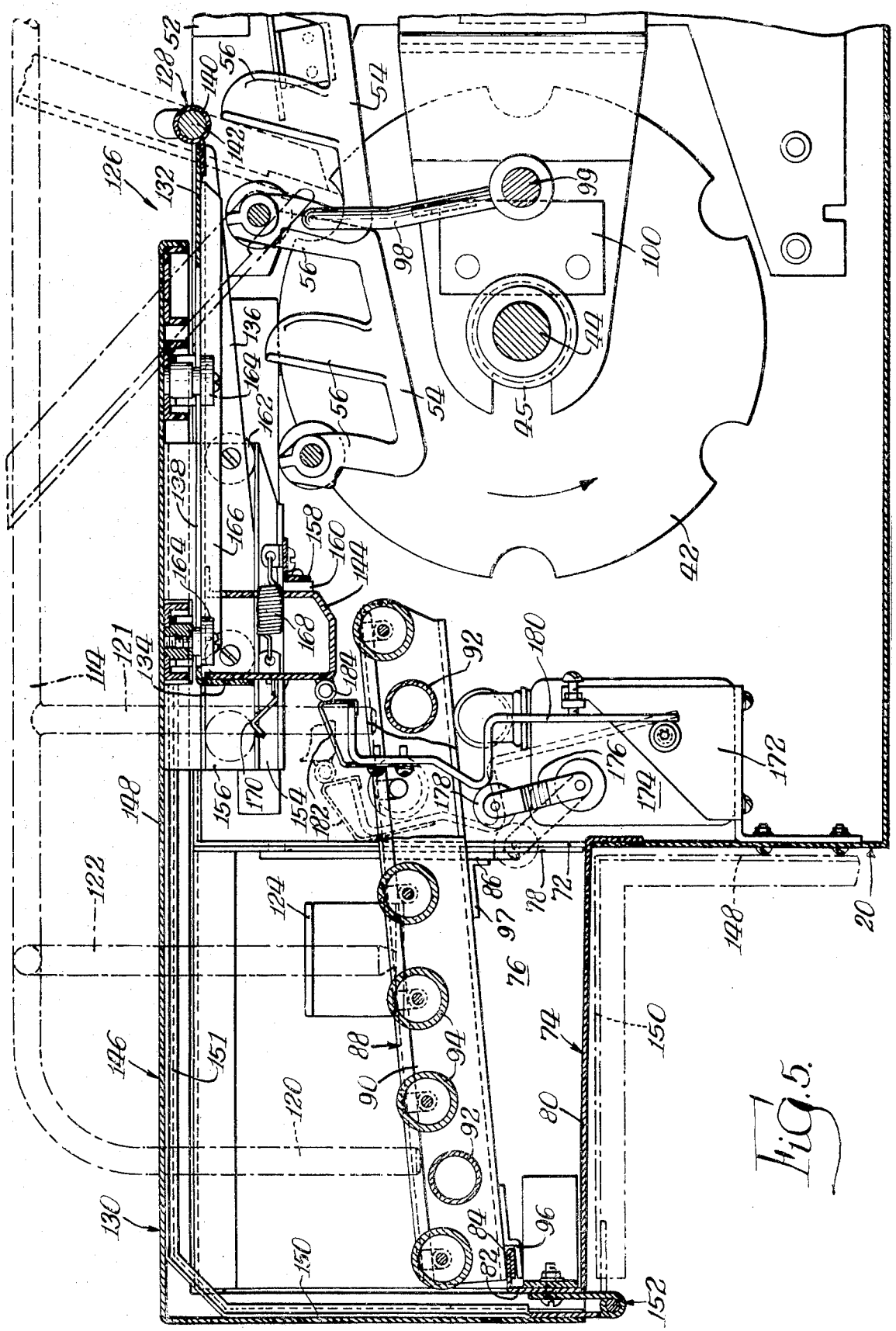
FIG. 5 is a longitudinal sectional view of the unloading end of the conveyor and the conveyor stop means of FIG. 4.

Referring now to FIG. 1, there is indicated generally by the reference numeral 10 a flight conveyor type dishwashing machine incorporating the principles of the present invention. The dishwashing machine 10 includes a series of similar sections 12 assembled and secured together endwise. Each section 12 comprises a base frame 14 and an open ended generally rectangular housing 16 supported thereby. Extending from the right-hand end of the series of sections 12, as viewed in FIGS. 1 and 2, is a housing 18 across which is mounted a horizontal stacking shelf 19; and extending from the left-hand end of the series of sections 12 is a housing 20 supported by a base frame 22. The sections 12, housings 18 and 20, and base frame 22 constitute the general framework of the dishwashing machine 10.

Suitably mounted within the housings 16 are upper and lower spray boxes 24 and 26 from which sprays or jets of water or washing solution are projected downwardly and upwardly as dishes, trays or other articles to be washed are moved through the machine. Also, mounted on each base frame 14 is a motor-pump unit 28 comprising an electric motor 30, a rotary impeller pump 32 driven thereby and having an outlet connected to the adjacent spray boxes 24 and 26 for delivering liquid under pressure thereto, and a sump chamber 34 which communicates with the bottom of the housing 16 and also with the inlet of the pump 32 for supplying liquid thereto.

Arranged lengthwise of the machine is conveyor means comprised of an endless conveyor 36 at one end trained about sprocket wheels 38 secured on a shaft 40 rotatably mounted in the housing 18 and at the other end trained about sprocket wheels 42 secured on a shaft 44. As shown in FIGS. 5, 7 and 8, the shaft 44 adjacent each end is journalled in a bearing sleeve 45 mounted in a bracket assembly 46 secured to the inboard side of the housing 20. As shown in FIG. 2, the conveyor 36 comprises side chains 47 connected by cross rods 48 having at the ends thereof rollers 50 which are suitably guided by track sections 52 (FIG. 5) mounted in the housings 16 and which are adapted to be received in recesses or notches provided in the sprockets 38 and 42. The cross rods 48 of the conveyor 36 provide support for, and are interconnected by, flights or links 54 of substantially W-shape extending inwardly between the runs of the conveyor and each having three outwardly extending fingers 56.

As shown in FIG. 1, there is provided conveyor drive means 58 which comprises a sprocket gear 60 secured on the shaft 44. A sprocket chain 62 is trained over the sprocket gear 60 and a sprocket pinion 64 secured on the drive shaft 66 of a speed reducer 68 mounted on the base frame 22 and driven by an electric motor 70. The sprockets 42 are driven in a counterclockwise direction, as viewed in FIG. 1, and the upper run of the conveyor 36 travels from right to left. It will be appreciated that the various components of the dishwashing machine 10 may be rearranged for operation of the conveyor 36 in the opposite direction.

The general dishwashing machine 10 is similar to that disclosed in the copending application of John Cumming, Ser. No. 574,427, filed Aug. 23, 1966; the motor-pump units 28 are similar to that disclosed in Pat. No. 3,108,607, issued on Oct. 29, 1963, to David G. Blakeslee; and the conveyor 36 is similar to that disclosed in Pat. No. 3,086,641, issued on April 23, 1963, to John Cumming. For further details concerning the above-described apparatus, which is not per se part of the present invention, reference may be had to the aforesaid copending application and patents.

The outer end of the housing 20 is formed with an opening bounded by in-turned vertical side flanges 72 (FIG. 5), and has secured thereto a casing extension 74 which constitutes part of the general framework of the dishwashing machine 10. The casing 74 is formed with sidewalls 76 having in-turned vertical side flanges 78 abutting the side flanges 72, and a bottom wall 80 having a short vertical transverse rear wall portion 82 with an inwardly directed flange portion 84. Secured to and projecting laterally inwardly of the side flanges 72 and 78 are support brackets 86.

Arranged longitudinally of, and at the unloading end of, the conveyor 36 is a roller conveyor assembly 88. The roller conveyor assembly 88 includes a frame comprised of side bars 90 which are interconnected by transverse tubes 92. Rotatably mounted in the side bars 90 are a plurality of rollers 94, and suitably affixed to the side bars 90 adjacent the rear ends thereof are engagement straps 96. The assembly 88 is mounted in the casing 74 in a rearwardly downwardly inclined position, the rear end portion thereof being supported by the rear wall flange 84 with the straps 96 engage therebeneath, the intermediate portion thereof being supported by the brackets 86 and located by a retaining angle 97, and the forward portion thereof being disposed to project into the housing 20. As will be described more fully hereinafter, the roller conveyor assembly 88 is adapted to receive trays and racks discharged from the conveyor 36 and to direct the same outwardly of the machine for automatic stacking into mobile tray carts at the foot of the machine. To effect rearward tilting of trays as they approach the unloading end of the conveyor 36, upwardly extending arms 98 are secured to a horizontal shaft 99 suitably mounted in the bracket assemblies 46 and restrained from rotation by lock bars 100 (FIGS. 5, 7 and 8).

As shown in FIGS. 1 and 2, guide means are provided at the front and rear of the machine 10 to align trays and the like moving therethrough when they are to be stacked at the foot of the machine. The front guide means includes a pair of laterally spaced guide rail sections 102 each comprised of a longitudinal body portion 104, a forward depending leg portion 106, and inverted L-shaped side leg portions 108. The lower ends of the leg portions 106 and 108 are removably supported on the framework by clamps 110 engaged with the periphery of the housing 18. The rear guide means includes a pair of laterally spaced guide rail sections 112 each comprised of a longitudinal body portion 114, a laterally outwardly directed forward arm portion 116 with a depending leg portion 118, a rear depending leg portion 120, an intermediate depending leg portion 121, and an inverted L-shaped side leg portion 122. The lower ends of the leg portions 118 and 122 are removably supported in brackets 124 carried at the periphery of the housing 20, while the lower ends of the leg portions 120 and 121 project below the plane of the upper surfaces of the rollers 94 intermediate the adjacent rollers.

Also arranged at the unloading end of the conveyor 36 is conveyor stop means 126 which comprises actuator means 128 and supporting and guide means 130 therefor.

As best shown in FIGS. 4 and 5, the actuator means 128 includes a generally rectangular panel member 132 having a downturned rear end portion 134, downturned side portions 136, and a central longitudinal slot 138. A tubular member 140 is suitably secured along the forward outer end of the panel member 132, and hand engageable rod members 142, with upwardly offset outer end portions, are secured in the ends of the tubular member 140. Secured to the rear end portion 134 and underside of the panel member 132 is a depending switch actuator frame 144.

The supporting means 130 includes an L-shaped frame member 146 comprised of an apron portion 148 and a leg portion 150 reinforced by channels 151. The frame member 146 is pivotally mounted to the rear casing wall 82 by means of hinge means 152 extending horizontally along the outer edge of the leg portion 150. Depending from the apron 148 are Z-shaped brackets 154 to which are secured longitudinal guide elements or C-shaped channel members 156 and a transverse brace 158 with resilient bumper means 160. Longitudinally spaced roller members 162 are rotatably mounted on horizontal axes to the sides 136 of the panel member 132 and are engageable at their outer peripheries with the channel members 156. Longitudinally spaced roller members 164 are also rotatably suspended on vertical axes from the apron 148 and are engageable at their outer peripheries with longitudinal guide elements or flanges 166 secured to the underside of the panel member 132 along the sides of the slot 138.

The conveyor stop means 126 may be pivoted to an inoperative position as shown in FIGS. 1 and 3 when the roller conveyor assembly 88 is to be used in connection with stacking trays or the like at the foot of the machine, or may be pivoted to an operative position resting on the casing 74 and housing 20 as shown in FIGS. 4 and 5 when use of the stop means is desired. In the latter position, the above described cooperating roller and guide means serve to support and guide the actuator means 128 for limited rectilinear movement in a horizontal path longitudinally of the conveyor 36. The actuator means 128 is normally biased to the inactive position shown in the drawings by means of a spring 168 connected between the switch actuator frame 144 and the transverse brace 158. Forward movement of the actuator means 128 is limited by engagement of the frame 144 with the bumper means 160. A spring latch 170 is secured to each of the Z-shaped brackets 154 and projects upwardly through a slot provided in each of the channel members 156. When the actuator means 128 is moved rearwardly from the position shown in FIG. 5, the rearward roller members 162 ride over the spring latches 170 and the actuator means 128 is thereby releasably maintained in such rearward position.

Mounted to the housing 20 by means of a bracket 172 is a micro-switch 174 having a switch arm 176 with a roller 178 at the outer end thereof. Also, pivotally mounted on the bracket 172 is a switch actuating arm 180 which intermediate of its ends engages the switch arm roller 178 and which at its upper end is provided with a depressible yieldable head portion in the form of a contoured leaf spring 182 engageable by a lateral finger or actuating element 184 carried by the switch actuator frame 144. The spring 182 is yieldable under engagement on the top side by the finger 184 to accommodate pivoting movement of the conveyor stop means 126 to the operative position shown in FIG. 5 whenever the actuator means 128 is not in the inactive position shown in FIG. 5. In the latter circumstances, as the actuator means 128 is returned to the inactive position, the finger 184 rides over the top of the spring 182 until the latter springs upwardly to the position shown in FIG. 5 with the front side thereof engaging the finger 184 for switch actuation. The switch arm 176 is spring loaded and cooperates with the spring 168 in normally biasing the actuator means 128 to the inactive position shown in FIG. 5. The switch 174 is connected in the electrical circuit of the motor 70. When the actuator means 128 is moved rearwardly from the position shown in FIG. 5, the finger 184 of the frame 144 pivots the switch actuating arm 180 and the switch arm 176 from the solid line position to the dotted line position to open the switch 174. In this manner, the motor 70 is deenergized and the conveyor drive means 58 is interruped to stop the conveyor 36.

As shown in FIGS. 9 and 10, a cart positioner assembly 186 is mounted on the lower portion of the base frame 22 at the unloading end of the machine. The assembly 186 includes a generally horizontal U-shaped frame 188 secured to the frame 22. Pivotally mounted therein is a cart positioner 190 having a pair of laterally spaced arms 192 interconnected by a transverse stabilizer bar 194 with a central flange element 196. When the cart positioner 190 is pivoted to the solid line position shown in FIG. 10, the arms 192 extend rearwardly and are adapted to be engaged by a mobile self-levelling tray storage cart 198 for accurately locating the latter to received trays discharged from the roller conveyor assembly 88. The cart 198 includes a generally rectangular base or body 200 supported on caster wheels 202, an upright standard or support 204, and a vertically adjustably stacking shelf 206. The positioner arms 192 are adapted to receive therebetween the body 200 of the cart 198, with the flange element 196 being engageable with the underside of the body 200 to prevent accidental forward pivoting of the cart positioner 190. To provide movement of the cart 198 during loading, the rear caster wheels 202 may be locked. When the cart positioner 190 is not in use, it may be pivotally moved forwardly from the dotted line position shown in FIG. 9 to the solid line position and nested within the frame 188.

Retaining means in the form of brackets 208 are adjustably secured to the sides of the positioner frame 188. When the conveyor stop means 126 is pivoted toward its inoperative position, the actuator means 128 rides over the inclined top surfaces of the brackets 208 and snaps into position forwardly of the brackets as shown in FIG. 10. The conveyor stop means 126 is thus retained by the bracket in its inoperative position. The conveyor stop means may be released by manually moving the actuator means 128 upwardly to clear the brackets 208 as the stop means is swung away from the inoperative position.

In one mode of operation of the machine 10, the conveyor stop means 126 is pivoted to and latched in the inoperative position shown for example in FIGS. 1, 3 and 10 exposing the roller conveyor assembly 88 for use, and the front and rear guide rail sections 102 and 112 are positioned as shown for example in FIGS. 1 and 2. As the conveyor 36 is moving, trays are inserted edgewise and transversely of the conveyor into the links 54 of the upper run thereof at the loading end. The front guide rail sections 102 align the trays longitudinally as they are inserted into the conveyor, while the rear guide rail sections 112 realign any trays that become dislodged during movement through the machine and maintain alignment thereof as the trays are discharged onto the roller conveyor assembly 88. After the trays have been subjected to washing and rinsing, and at the unloading end of the conveyor 36, the trays are tilted rearwardly by the fingers 98 from the dash line position to the dot dash line position as shown in FIG. 5. The trays are then discharged from the conveyor onto the roller conveyor assembly 88 and are directed outwardly of the machine and automatically stacked in a tray cart 198 at the foot of the machine. As will be appreciated, empty racks or baskets may also be washed and automatically stacked in a manner similar to trays.

In a different mode of operation of the machine 10, the front and rear guide rail sections 102 and 112 are removed from the machine, and the conveyor stop means 126 is pivoted to the operative position shown in FIGS. 4 and 5. When the conveyor stop means 126 is in operative position, the roller conveyor assembly 88 underlies and is enclosed by the stop means. The conveyor 36 is loaded with articles to be washed at the right-hand end of the machine, and articles that have been washed are manually unloaded from the conveyor at the left-hand end. More particularly, plates and other articles of flat ware are inserted edgewise and transversely of the conveyor into the links 54 of the upper run thereof while the latter is traveling toward the unloading end of the machine. Smaller articles such as cups, glasses, cutlery, and the like are placed in open work baskets or racks which are set upon the upper run of the conveyor. During travel of the articles through the machine, they are subjected to washing and rinsing operations, and are thereafter manually removed from the conveyor, during continued travel thereof, at the unloading end and may be stacked upon the apron 148.

In this mode of operation, all articles should be removed from the conveyor before they reach the stop means 126. In the event an article is not removed from the upper run of the conveyor 36 in good time, in the continued travel of the conveyor the article will contact the front end of the actuator means 128 and move the same rearwardly from the inactive position shown for example in FIG. 5. The switch 174 is thereby opened and the conveyor drive means 58 is interrupted to stop the conveyor 36 in the manner previously described. When the article contacting the actuator means 128 is removed from the conveyor 36, the spring 168 restores the actuator means 128 to the inactive position shown in FIG. 5 and operation of the conveyor 36 is resumed.

Additionally, whenever desired or required, an operator may selectively interrupt the conveyor drive means 58 to stop the conveyor 36 by grasping either of the handles 142 and manually moving the actuator means 128 rearwardly from the inactive position shown in FIG. 5. When the actuator means 128 is moved rearwardly, the spring latches 170, as previously described, serve to releasably retain the actuator means 128 away from the inactive position to selectively maintain interruption of the conveyor drive means 58. To restore operation of the conveyor 36, the operator need only grasp either of the handles 142 and manually move the actuator means 128 forwardly until the rearward roller members 162 ride back over the spring latches 170 at which time the spring 168 will return the actuator means 128 to the inactive position shown in FIG. 5.

What we claim is:

1. In a dishwashing machine including framework, endless conveyor means for moving articles to be washed through the machine and presenting a loading end and an unloading end, and drive means for the conveyor means, the improvement of conveyor stop means disposable in an operative position at the unloading end of the conveyor means and comprising actuator means normally disposed in an inactive position, means supporting said actuator means for limited rectilinear movement in a horizontal path longitudinally of the conveyor means, said supporting means comprising an L-shaped frame member having an apron portion and a leg portion, said actuator means being movable from said inactive position upon engagement by an article moving with the conveyor means to effect interruption of the drive means, means pivotally mounting said supporting means to the framework whereby said conveyor stop means may be pivoted away from said operative position to an inoperative position, said mounting means extending horizontally along the outer edge of said leg portion, and said actuator means underlying said apron portion.

2. The improvement of claim 1 wherein said actuator means comprises a generally rectangular panel member, and said supporting means comprises cooperating roller and guide means between said apron portion and said panel member.

3. The improvement of claim 2 including means on said panel member at the outer end portion thereof engageable by hand whereby to accommodate manual movement of said panel member from said inactive position to selectively effect interruption of the drive means.

4. The improvement of claim 2 including switch means mounted on the framework and operable by said panel member when said conveyor stop means is in operative position and said panel member is moved from said inactive position to effect interruption of the drive means.

5. The improvement of claim 2 including an actuating element on said panel member, switch means mounted on the framework, and a switch actuating arm having a head which is yieldable under engagement on one side by said actuating element to accommodate movement of said conveyor stop means to said operative position whenever said panel member is not in said inactive position and which is engageable on the adjacent side with said actuating element for switch actuation when said conveyor stop means is in said operative position and said panel member is in and moved from said inactive position to effect interruption of the drive means.

6. The improvement of claim 1 including a roller conveyor assembly at the unloading end of the conveyor, said roller conveyor assembly underlying said conveyor stop means when the latter is in operative position, and said roller conveyor assembly being adapted to receive trays and the like discharged from the conveyor and to direct the same outwardly of the machine when said conveyor stop means is in inoperative position.

7. The improvement of claim 6 including removable guide means supported on the framework at the loading and unloading ends of the conveyor for aligning trays and the like longitudinally of the conveyor as they move through the machine and are discharged onto said roller conveyor assembly when said conveyor stop means is in inoperative position.

8. The improvement of claim 6 including a cart positioner assembly mounted at the lower portion of the unloading end of the framework and being adapted to be engaged by a mobile tray cart for accurately locating the latter to receive trays discharged from said roller conveyor assembly.

9. The improvement of claim 8 wherein said cart positioner assembly is comprised of a cart positioner having a pair of laterally spaced rearwardly extending arms which are adapted to receive therebetween the body of a mobile tray cart.

10. The improvement of claim 8 wherein guide means are provided at both the loading end and the unloading end of the conveyor; wherein said guide means at the loading end of the conveyor includes a pair of laterally spaced guide rail sections each comprised of a longitudinal body portion, a forward depending leg portion, and inverted L-shaped side leg portions; and wherein said guide means at the unloading end of the conveyor includes a pair of laterally spaced guide rail sections each comprised of a longitudinal body portion, a laterally outwardly directed forward arm portion with a depending leg portion, a rear depending leg portion, an intermediate depending leg portion, and an inverted L-shaped side leg portion.

11. In a dishwashing machine including framework, endless conveyor means for moving articles to be washed through the machine and presenting a loading end and an unloading end, and drive means for the conveyor means, the improvement of conveyor stop means disposable in an operative position at the unloading end of the conveyor means and comprising actuator means normally disposed in an inactive position, means supporting said actuator means for limited rectilinear movement in a horizontal path longitudinally of the conveyor means, said actuator means being movable from said inactive position upon engagement by an article moving with the conveyor means to effect interruption of the drive means, means pivotally mounting said supporting means to the framework whereby said conveyor stop means may be pivoted away from said operative position to an inoperative position, a roller conveyor assembly at the unloading end of the conveyor, said roller conveyor assembly underlying said conveyor stop means when the latter is in operative position, said roller conveyor assembly being adapted to receive trays and the like discharged from the conveyor and to direct the same outwardly of the machine when said conveyor stop means is in an inoperative position, a cart positioner assembly including a frame secured to the framework at the lower portion of the unloading end thereof and a cart positioner having a pair of laterally spaced rearwardly extending arms which are adapted to receive therebetween the body of a mobile tray cart for accurately locating the latter to receive trays discharged from said roller conveyor assembly, and said cart positioner being pivotally mounted to said frame whereby said cart positioner may be pivoted forwardly and nested within said frame when not in use.

12. The improvement of claim 11 wherein said cart positioner has a flange element engageable with the underside of the body of a mobile tray cart to prevent accidental forward pivoting of said cart positioner.

13. The improvement of claim 11 including retaining means secured to said frame and adapted to be engaged by said actuator means for releasably maintaining said conveyor stop means in said inoperative position.

14. In a dishwashing machine including framework, conveyor means for moving articles to be washed through the machine and presenting a loading end and an unloading end, the improvement which comprises: a roller conveyor assembly at the unloading end of the conveyor and being adapted to receive trays and the like discharged from the conveyor and to direct the same outwardly of the machine; guide means supported on the framework at both the loading end and the unloading end of the conveyor for aligning trays and the like longitudinally of the conveyor; said guide means at the loading end of the conveyor including a pair of laterally spaced rail sections each comprised of a longitudinal body portion, a forward depending leg portion, and inverted L-shaped side leg portions; and said guide means at the unloading end of the conveyor including a pair of laterally spaced guide rail sections each comprised of a longitudinal body portion, a laterally outwardly directed forward arm portion with a depending leg portion, a rear depending leg portion, an intermediate depending leg portion, and an inverted L-shaped side leg portion.

15. In a dishwashing machine including framework, conveyor means for moving articles to be washed through the machine and presenting a loading end and an unloading end, the improvement which comprises a roller conveyor assembly at the unloading end of the conveyor, said roller conveyor assembly being adapted to receive trays and the like discharged from the conveyor and to direct the same outwardly of the machine, and upwardly projecting stationary arm means supported on the framework at the unloading end of the conveyor and being engageable by trays carried edgewise in the conveyor for effecting tilting of the latter in a rearward direction as the trays are about to be discharged from the conveyor onto said roller conveyor assembly.

16. In a dishwashing machine including framework and presenting a loading end and an unloading end, and conveyor means for moving trays and the like to be washed through the machine, the improvement which comprises a cart positioner assembly including a generally horizontal U-shaped frame with the leg portions thereof secured to the lower portion of the unloading end of the framework and with the bight portion thereof projecting rearwardly beyond the latter, and a cart positioner having a pair of laterally spaced rearwardly extending arms which are adapted to receive therebetween the body of a mobile tray cart for accurately locating the latter to receive trays discharged from the conveyor means, said cart positioner being pivotally mounted to said frame whereby said cart positioner may be pivoted forwardly and nested within said frame when not in use.

17. The improvement of claim 16 wherein said cart positioner has a flange element engageable with the underside of the body of a mobile tray cart to prevent accidental forward pivoting of said cart positioner.

References Cited

UNITED STATES PATENTS

| | | | |
|---|---|---|---|
| 2,644,473 | 7/1953 | Fox et al. | 198—232 X |
| 2,986,268 | 5/1961 | Robson et al. | 198—232 |
| 3,216,547 | 11/1965 | Good et al. | 193—32 |
| 2,626,039 | 1/1953 | Wetherington et al. | 198—232 |
| 2,620,932 | 12/1952 | Alpine | 214—38.24 |
| 1,996,523 | 4/1935 | Pfeifer et al. | 214—38.24 |

RICHARD E. AEGERTER, Primary Examiner

R. S. GAITHER, Assistant Examiner

U.S. Cl. X.R.

198—232; 214—38.24